June 6, 1950  R. J. LEANDER  2,510,120
MASKING PAPER
Filed May 31, 1946
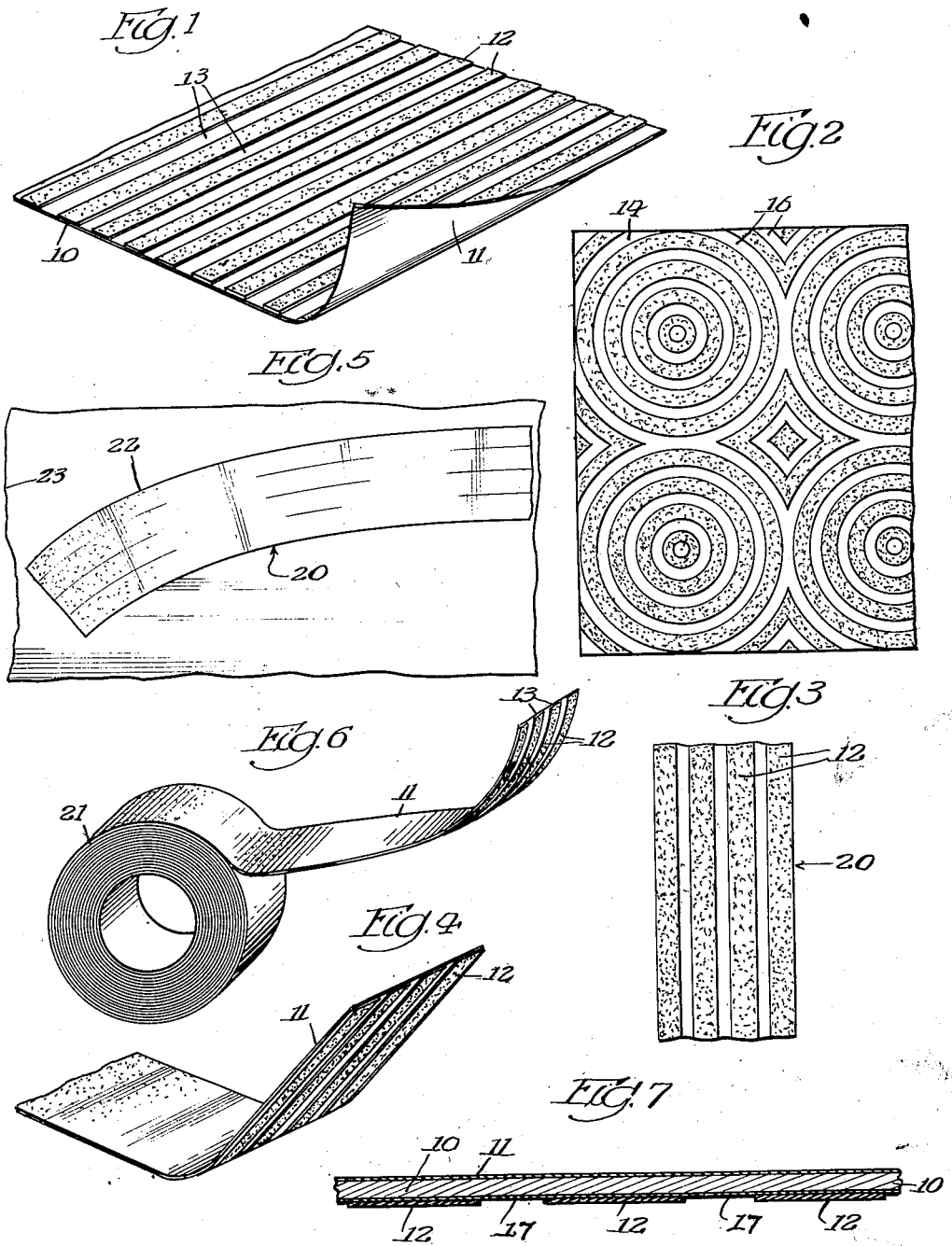
Inventor:
Russell J. Leander
By Kent W. Worrell
Atty.

Patented June 6, 1950

2,510,120

UNITED STATES PATENT OFFICE 2,510,120

MASKING PAPER

Russell J. Leander, Chicago, Ill.

Application May 31, 1946, Serial No. 673,442

2 Claims. (Cl. 117—122)

This invention relates in general to an adhesive cover sheet of paper adapted to be applied to surfaces, plain, curved, and irregular, and to conform and adhere closely thereto; capable of removal in large sheets or pieces; and applied and removed without marking, permanent adherence or damage to any surface.

This masking paper is more particularly described as an elastic paper base capable of stretching in both dimensions, having an adhesive applied in rows on one face with alternate blank rows, and the other or release face resin coated to prevent permanent or even semi-permanent adherence of the adhesive side thereto.

An important object of the invention is to provide one face of a masking paper with an adhesive applied in areas, patterns or narrow rows alternated with or separated by areas, spaces or rows free from adhesive.

Another object of the invention is to provide a masking paper with alternate clear and adhesive rows on one face and an adhesive resistant coating on the other side.

Still a further object is to provide a stretchable masking paper with alternate clear and pressure adhesive rows so that the paper may be applied to even and uneven surfaces and contours and may be removed without damage to a surface in large pieces or from an entire area in one piece.

A still further object of the invention is to provide a stretchable masking paper with a thermoplastic adhesive resistant coating on one face and an adhesive coating on the other face comprising alternate rows of pressure sensitive adhesive and rows having no adhesive.

Other objects of the invention will appear in the specification and will be apparent from the accompanying drawings in which:

Fig. 1 is a perspective of a fragmentary piece of masking paper having rows of adhesive on one side and with a resin coating on the release side;

Fig. 2 represents a fragment of a masking paper having the adhesive applied thereto in circular rings rather than straight rows;

Fig. 3 shows a fragment of a piece of tape having rows of adhesive separated by spaces or rows free from adhesive;

Fig. 4 is a perspective represented as having rows of adhesive on one side of the tape and a resin coated release material on the other side of the material;

Fig. 5 shows a straight piece of tape as shown in Fig. 4 which is stretched to conform to a desired curvature;

Fig. 6 is a perspective showing a roll of tape of the type shown in Fig. 4; and

Fig. 7 is a fragmentary section of a piece of paper in accordance with this invention having a resin coat upon one side and adhesive rows on the other side separated by rows free from an adhesive.

This type of masking paper has a wide application to various articles of manufacture as a cover and protection. It may be furnished in wide pieces or cut into small strips and rolled in the form of tape. The paper itself is impregnated with rubber or an equivalent material to make it stretchable so that it may be applied to various uneven surfaces, following projections and contours thereof; the paper may be stretched and bent to define an outline of curved or irregular form and in any form, the paper is removable in large pieces or as a whole without injury to any surface.

Referring now more particularly to the drawings, a paper base 10 is impregnated with rubber or any similar material to make it stretchable as much as 15% (per cent) in both dimensions. The paper is smooth having a calendered finish to which a resin coating 11 of thermoplastic resin is applied on one face known as the "release" side opposite the adhesive side or face.

Parallel rows of adhesive 12 are applied to the surface of the paper and these rows are separated by alternate rows 13 free from adhesive and providing a release space for the adhesive surface.

Instead of providing parallel rows as shown in Fig. 1, any suitable pattern may be applied to a similar sheet 14 such as circular or concentric rings 15 of adhesive separated by alternate rows 16 to which no adhesive is applied. Other patterns and designs employing a similar distribution of adhesive and non-adhesive portions closely adjacent to each other are contemplated, but in continuously applying the adhesive to a long strip or a roll of paper, it is more desirable to apply the adhesive in parallel rows.

The type of adhesive which is applied to the paper is preferably a pressure sensitive adhesive containing a rubber or rubber-like material such as a crude or synthetic rubber base which has the advantage that when the paper is applied to any surface or contour, it will not stain or mar the material to which it is applied even though it be a highly polished surface of wood, varnish paint, or any other material.

In practice, the paper employed preferably a rubber impregnated paper may have a thickness of about 5 mils, that is, five-thousandths of one inch, the adhesive may have a thickness of approximately one mil or one-thousandth of an inch; the adhesive strips 12 may be approximately one-quarter of an inch wide and the free strips 13 somewhat narrower such as one-sixteenth or one-eighth of an inch in width.

If desired or necessary, a bonding coating 17 may be applied to the paper before the adhesive is applied thereto as the adhesive will adhere more firmly to the bond than to the surface of the paper itself.

This masking paper is preferably prepared from a roll and in a width of thirty-six inches or more, the rows of adhesive being applied with a spreader blade arranged in tight contact with the paper to limit the thickness of the adhesive and to make it uniform in application. In such broad sheets, it is applied to various surfaces for protecting them from rust, abrasion, weather, and the like and is extensively used for protecting stainless steel sheets which are piled together for storage. In such application, it protects polished surfaces, preserves the polish; it is not injurious to any surface and may be easily and quickly applied thereto, simply pressing the adhesive side of the paper against the surface to be covered and conforming because the paper itself is stretchable to various projections, depressions and inequalities without tearing or breaking the paper.

For fabrication processes of sheet steel and the like, the paper may be left on, marking the outline or pattern for treatment of the sheet steel on the outer surface of the masking paper. By leaving the masking paper on, the stretching characteristic allows bending of the sheet steel, wood, and the like to which the paper is applied. Ordinary paper like kraft paper has no stretch or give and will break upon bending.

Another application and use of this paper is to cut or form it in narrow strips 20 as shown in Figs. 3, 4, 5 and 6 with similar adhesive rows 12 separated by narrower rows 13 to which no adhesive is applied and with the same thermoplastic resin coating 11 which adapts strips or tape of this material to be contained in rolls 21 so that the tape can be readily contained therein and removed therefrom as desired for various uses.

One of the uses of the tape or even of the edge of a large piece of material itself is in forming a curve or a contour 22 upon the surface of any material 23 to which it is applied.

With this construction, no liner is applied for rolls of the masking paper since the thermoplastic resin coating 11 is non-adhesive, it is water-resistant and although the pressure sensitive adhesive will adhere thereto for the purpose of keeping the surfaces together, it does not stick tightly thereto and may be easily peeled or separated from the release side. One of the material advantages of this type of masking paper is that it can be removed readily in large areas or stripped from surfaces to which it is applied in a single piece. Kraft or other paper tears into small pieces, thus making it more difficult, more laborious, and taking more time to remove the masking paper from any surface or material to which it is applied. The ease with which the paper is removed from any surface is due in a large degree to the free space or rows of free space between the rows or areas and pressure sensitive adhesive.

Because the adhesive has a crude rubber base, it does not stain or soil any surface; it strips easily therefrom and leaves no residue and also leaves no appreciable amount of adhesive on the surface from which it has been stripped so that anything else will adhere to that surface.

While a preferred embodiment of the invention has been thus described in detail, it should be regarded by way of illustration rather than as a limitation of the invention since various changes in the construction, combination and arrangement of the various parts and features making up the invention may be changed without departing from the spirit and scope of the invention.

I claim:

1. An adhesive protecting sheet applicable and removable in large areas, and comprising a rubber base pressure sensitive adhesive surface having alternate rows of pressure sensitive adhesive and rows free from adhesive, the adhesive rows being wider than the rows free from the adhesive.

2. A protecting removable rubber impregnated elastic paper to provide for a 15% (fifteen percent) stretch in both dimensions and having a rubber base pressure sensitive coating in alternate free and coated rows on one surface, the coated rows being approximately twice as wide as the free rows.

RUSSELL J. LEANDER.

REFERENCES CITED

The following references are of record in the file of this patent:

UNITED STATES PATENTS

| Number | Name | Date |
| --- | --- | --- |
| 768,734 | Clark | Aug. 30, 1904 |
| 968,681 | Paddock | Aug. 30, 1910 |
| 2,253,922 | Van Cleef | Aug. 26, 1941 |
| 2,349,710 | Evans | May 23, 1944 |